(12) United States Patent
Chen (10) Patent No.: US 6,843,579 B2
(45) Date of Patent: Jan. 18, 2005

(54) ILLUMINATIVE UNIVERSAL JOINT

(76) Inventor: Terence Chen, No. 325, YungChing Rd., Tung Shan Hsiang, Lo Tung Town, Yi Lan Hsien (TW)

( * ) Notice: Subject to any disclaimer, the term of this patent is extended or adjusted under 35 U.S.C. 154(b) by 0 days.

(21) Appl. No.: 10/436,412

(22) Filed: May 13, 2003

(65) Prior Publication Data
US 2004/0212989 A1 Oct. 28, 2004

(30) Foreign Application Priority Data
Apr. 22, 2003 (TW) .................................. 92109545 A (51) Int. Cl.$^7$ ............................................... B25B 23/18
(52) U.S. Cl. ...................................... 362/119; 362/199
(58) Field of Search ............................... 362/119, 120, 362/197, 198, 199

(56) References Cited
U.S. PATENT DOCUMENTS 4,253,134 A * 2/1981 Barnaby ..................... 362/119
6,092,907 A * 7/2000 Brantley et al. ............ 362/119
6,186,638 B1 * 2/2001 Chang ........................ 362/119
6,213,620 B1 * 4/2001 Huang ........................ 362/119
6,712,484 B2 * 3/2004 Hsien ......................... 362/119

* cited by examiner

Primary Examiner—Alan Cariaso
Assistant Examiner—Ali Alavi
(74) Attorney, Agent, or Firm—Alan D. Kamrath; Nikolai & Mersereau, P.A.

(57) ABSTRACT

An illuminative universal joint includes a first element, a second element, a third element connected between the first element and the second element, an illuminative device, a switch and a head. The first element is for engagement with a handle. The second element defines a space. The third element includes an end pivotally connected with the first element and an opposite end pivotally connected with the second element. The illuminative device is installed in the space for emitting light. The switch is mounted on the second element for turning on and off the illuminative device. The head includes a first insert fit in the space, a second insert for insertion into a tool bit and a hole defined therein for passing light.

10 Claims, 8 Drawing Sheets

ILLUMINATIVE UNIVERSAL JOINT

FIELD OF INVENTION

The present invention relates to a socket wrench including a handle and a socket and, more particularly, to an illuminative joint between the handle and the socket.

BACKGROUND OF INVENTION

Taiwanese Patent Publication No. 474237 discloses an illuminative device 30 of a socket wrench. The socket includes a socket 10 in which the illuminative device 30 is installed. The illuminative device 30 includes a light 31 and two batteries 38. The socket 10 defines a square hole 11 in an end and a hexangular hole 12 in an opposite end. The square hole 11 is for receiving a square insert 51 of the handle 50. The hexangular hole 12 is for receiving a hexangular insert of a selective one of several joints 20, 21 and 22. Each of the joints 20, 21 and 22 can be connected with sockets (not shown) for engagement with bolts. Each of the joints 20, 21 and 22 defines a hole 203 through which light can pass. This structure however does not fit in open-ended wrenches. Moreover, the light 31 is not turned on until the square insert 51 is inserted in the square hole 11, i.e., the illuminative device 30 only works dependently.

The present invention is therefore intended to obviate or at least alleviate the problems encountered in the prior art.

SUMMARY OF INVENTION

The primary objective of the present invention is to provide an illuminative joint between a handle and a socket of a socket wrench.

According to the present invention, an illuminative universal joint includes a first element, a second element, a third element connected between the first element and the second element, an illuminative device, a switch and a head. The first element is for engagement with a handle. The second element defines a space. The third element includes an end pivotally connected with the first element and an opposite end pivotally connected with the second element. The illuminative device is installed in the space for emitting light. The switch is mounted on the second element for turning on and off the illuminative device. The head includes a first insert fit in the space, a second insert for insertion into a tool bit and a hole defined therein for passing light.

Other objectives, advantages and novel features of the invention will become more apparent from the following detailed description in conjunction with the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
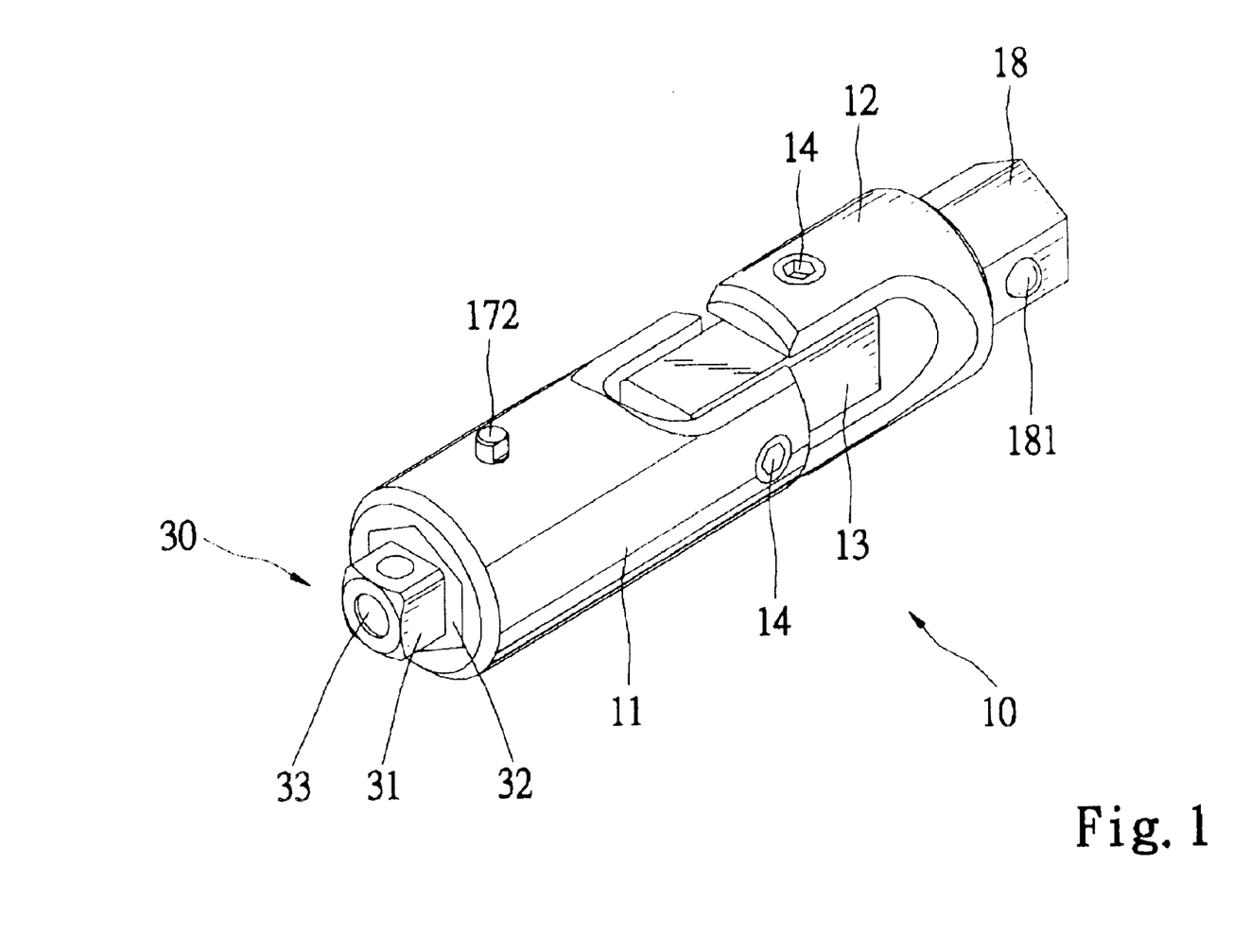
FIG. 1 is a perspective view of an illuminative joint between a handle and a socket of a socket wrench according to the preferred embodiment of the present invention.

Referring to FIG. 1, according to the preferred embodiment of the present invention, an illuminative universal joint 10 includes a first element 12, a second element 11 and a third element 13 connected between the first element 12 and the second element 11. The first element 12 includes two tabs (not numbered) at an end and a hexangular insert 18 at an opposite end. The second element 11 includes two tabs (not numbered) at an end and a socket (not numbered) at an opposite end. The third element 13 is a square rod. The tabs of the first element 12 are pivotally connected with two sides of the third element 13 by means of a pin 14. The tabs of the second element 11 are pivotally connected with the other sides of the third element 13 by means of another pin 14.

Figure 2:
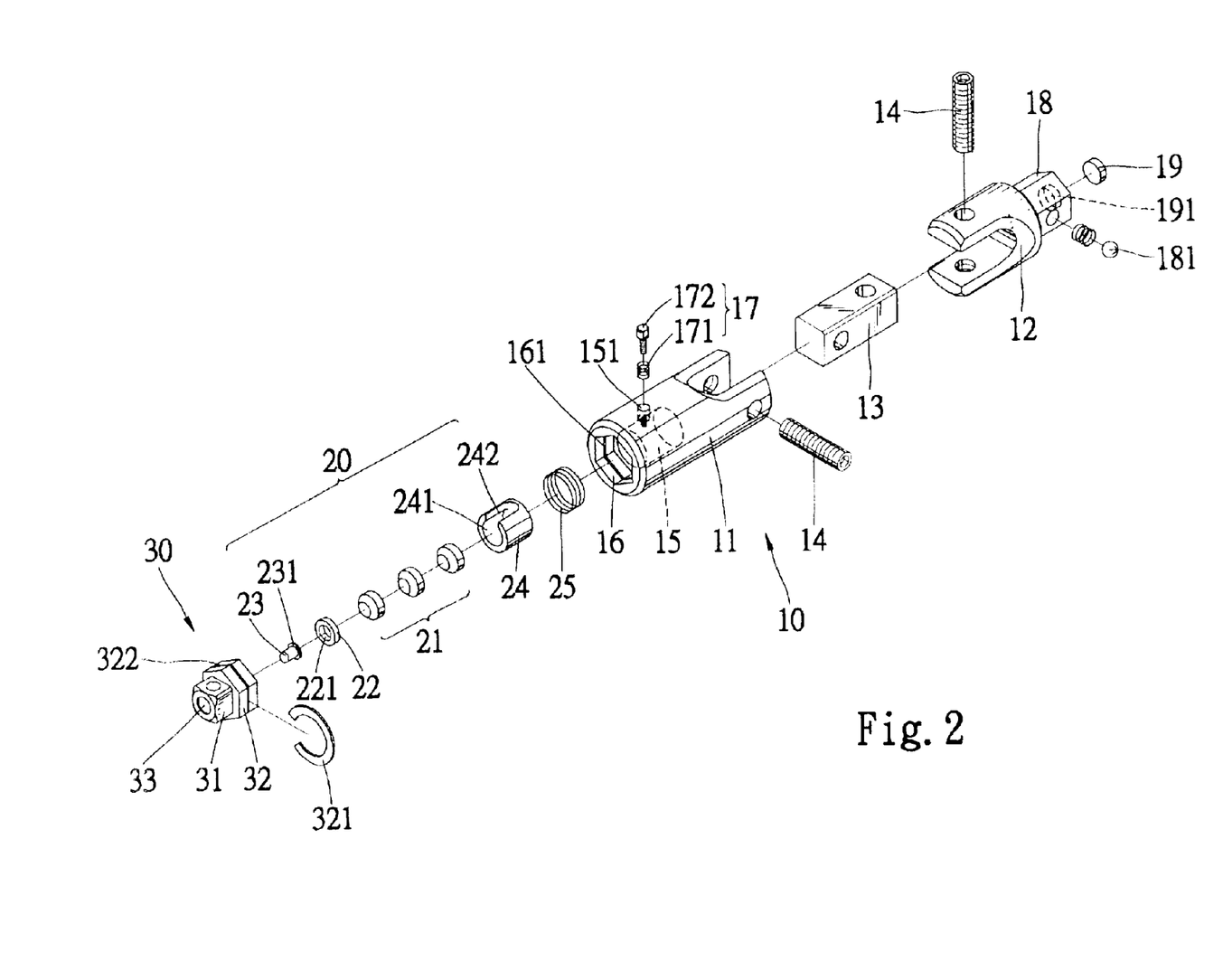
FIG. 2 is an exploded view of the illuminative joint of FIG. 1.
Figures 3, 4:
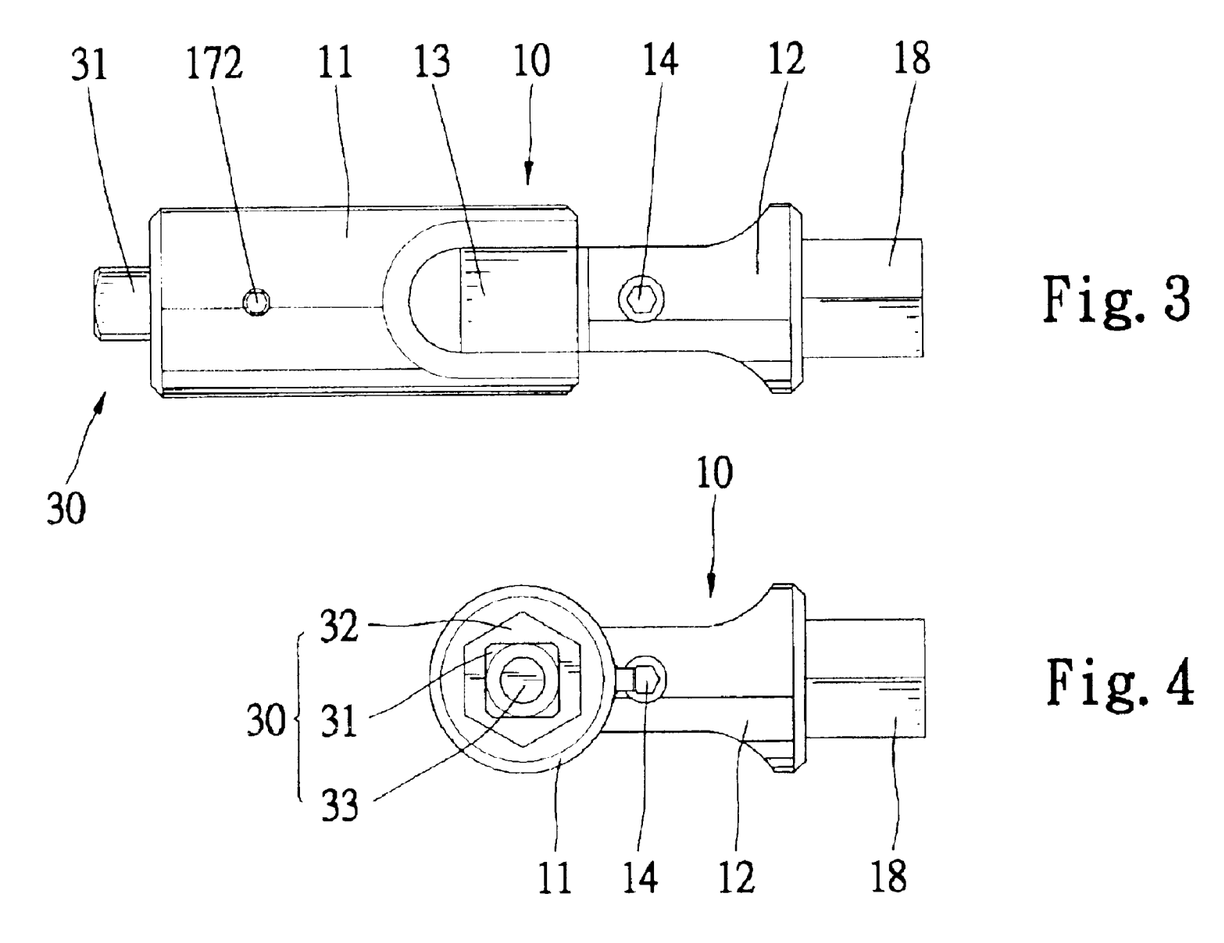
FIG. 3 is a top view of the illuminative joint of FIG. 1
FIG. 4 is similar to FIG. 3 but showing the illuminative joint in a bent position.
Figure 5:
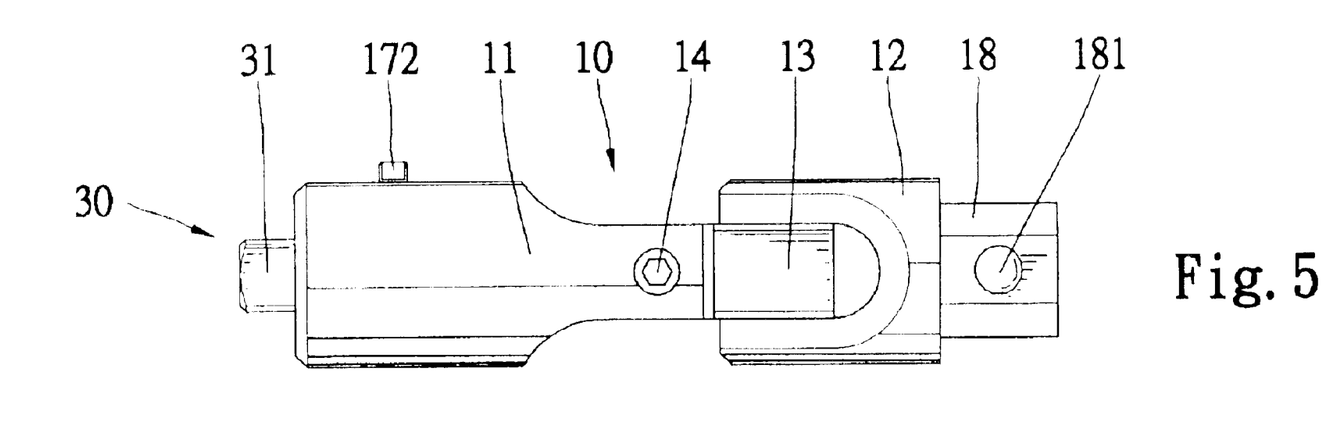
FIG. 5 is a right side view of the illuminative joint of FIG. 1.
Figure 6:
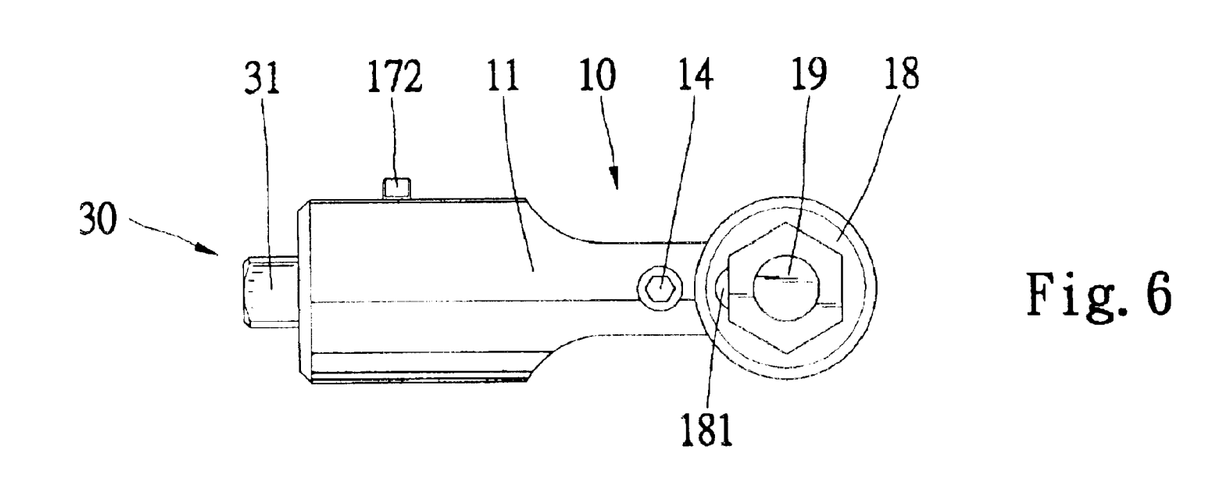
FIG. 6 is similar to FIG. 5 but showing the illuminative joint in a bent position.

Referring to FIG. 2, the hexangular insert 18 of the first element 12 defines a cavity 191 for receiving a magnet 19. A spring-biased ball detent 181 is installed at the hexangular insert 18.

The socket of the second element 11 includes a circular cavity 15 defined axially therein, a countersink hole 151 defined transversely therein and communicated with the circular space 15, a hexangular hole 16 defined axially therein and communicated with the circular cavity 15 and a groove 161 defined in the wall of the hexangular hole 16.

A switch 17 is installed in the countersink hole 151. The switch 17 includes a spring 171 and a bolt 172.

In the circular space 15 is an illuminative device 20 including a spring 25, a socket 24, three batteries 21, an electrically isolative ring 22 and a light source 23. The socket 24 defines a space 241 for receiving the batteries 21 and a slot 242 for receiving the bolt 172. The electrically isolative ring 22 defines a hole 221. The light source 23 includes a terminal extending through the hole 221 to the batteries 21. The light source 23 includes an annular flange 231 formed thereon. The light source 23 may be an LED.

Figure 9:
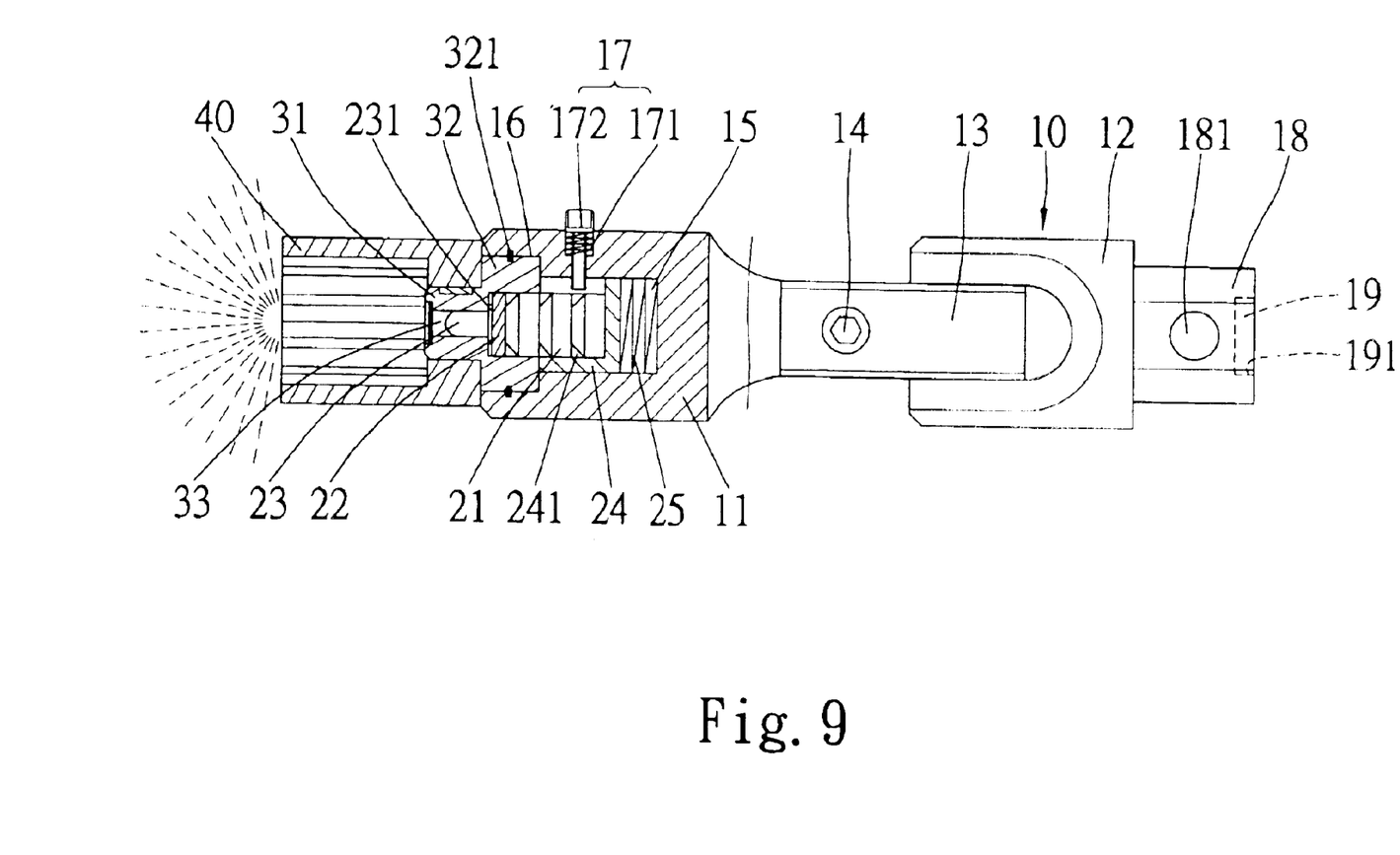
FIG. 9 is similar to FIG. 8 but showing the illuminative joint connected with a socket

A head 30 includes a hexangular insert 32 inserted in the square hole 16 and a square insert 31 for insertion in a square hole defined in a socket 40 (see FIG. 9). The hexangular insert 32 includes a groove 322 defined therein. A C-ring 321 includes an internal edge put in the groove 322 and an external edge put in the groove 161, thus retaining the head 30 attached to the second element 11. A spring-biased ball detent (not shown) may be installed at the square insert 31. The head 30 defines a hole 33 through which light passes.

Referring to FIGS. 3–6, the second element 11 can be pivoted relative to the first element 12 in two planes orthogonal to each other.

Figure 7:
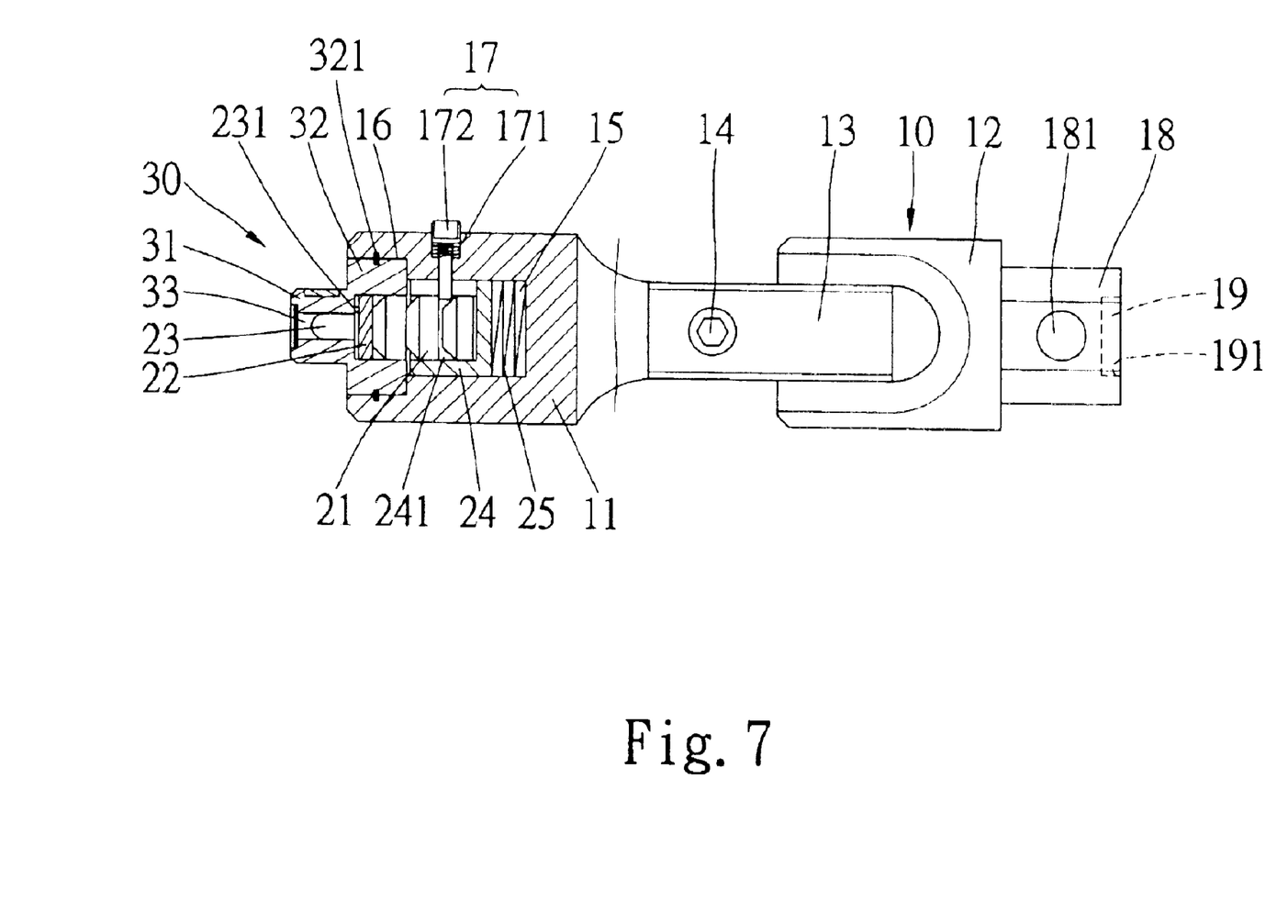
FIG. 7 is a partially cross-sectional view of the illuminative joint of FIG. 1.

Referring to FIG. 7, the bolt 172 separates one of the batteries 21 from the other of the batteries 21, thus forming an open loop. Therefore, the light source 23 is off.

Figure 8:
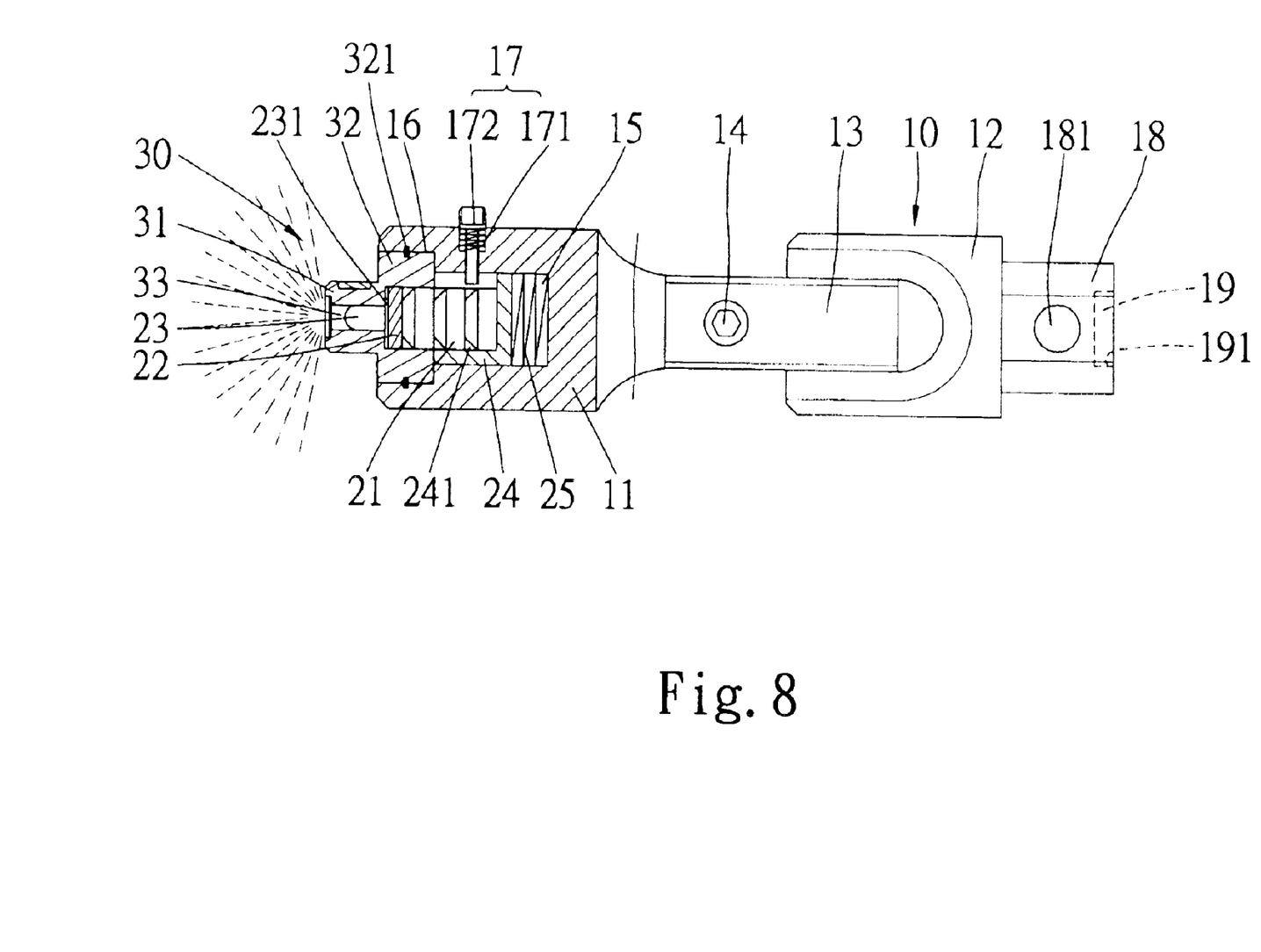
FIG. 8 is similar to FIG. 7 but showing the illuminative joint emitting light.

Referring to FIG. 8, the bolt 172 is driven from the batteries 21, thus forming a closed loop. Therefore, the light source 23 is on.

Referring to FIG. 9, light passes through the hole 33 and a hole defined in the socket 40.

Figure 10:
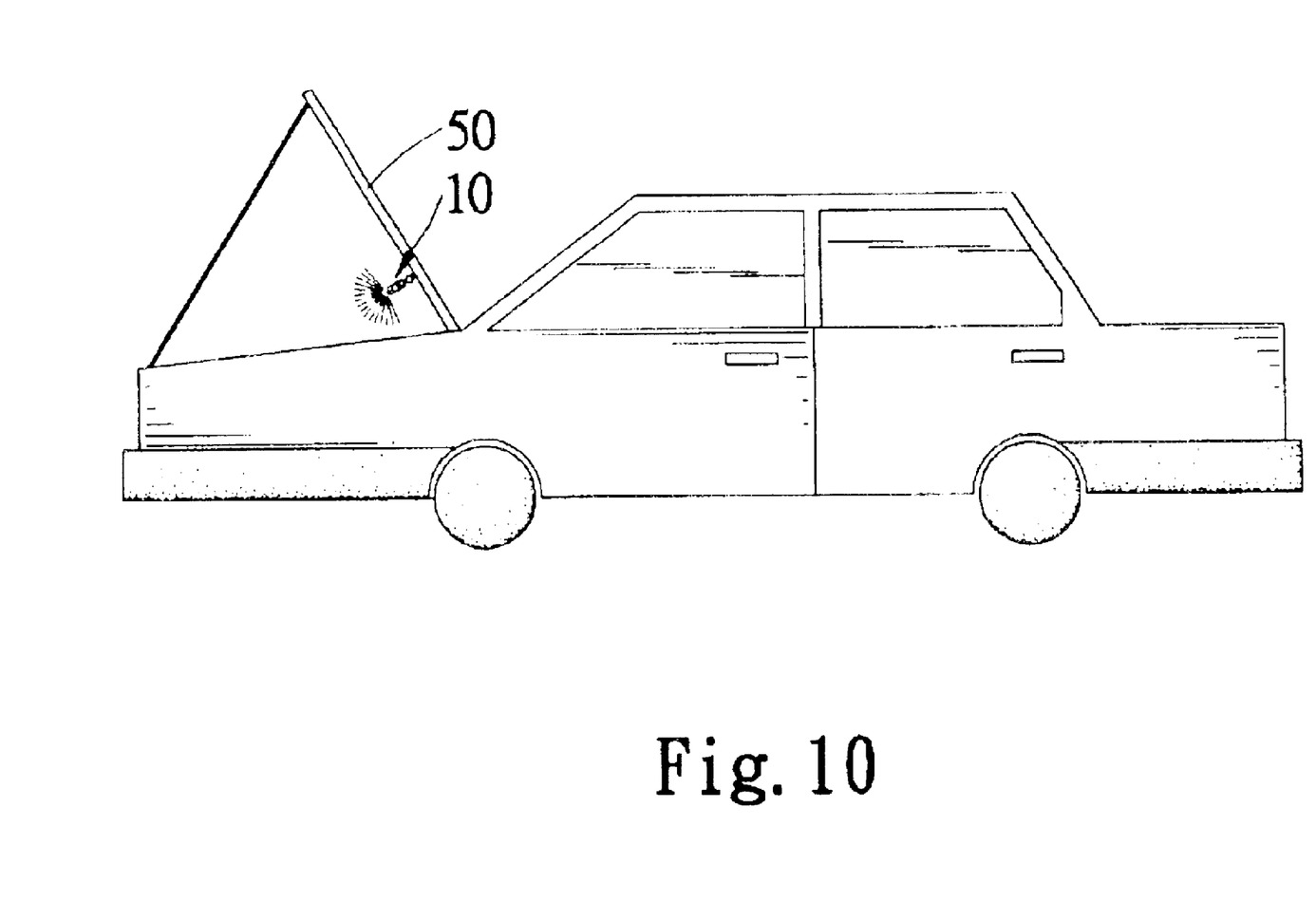
FIG. 10 is a side view of a vehicle in which the illuminative joint of FIG. 9 is used.

Referring to FIG. 10, the illuminative joint 10 is magnetically attached to a front hood 50 of a vehicle because of the magnet 19.

The present invention has been described via detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. An illuminative universal joint including:

a first element for engagement with a handle;

a second element defining a space;

a third element including an end pivotally connected with the first element and an opposite end pivotally connected with the second element;

an illuminative device installed in the space for emitting light;

a switch mounted on the second element for turning on and off the illuminative device; and a head including a first insert fit in the space, a second insert for insertion into a tool bit and a hole defined therein for passing light.

2. The illuminative universal joint according to claim 1 including a magnet attached to the first element.

3. The illuminative universal joint according to claim 2 wherein the first element defines a cavity for receiving the magnet.

4. The illuminative universal joint according to claim 1 wherein the illuminative device includes a spring, at least two batteries biased by means of the spring, an electrically isolative ring in contact with a last one of the batteries and a light source including a terminal extending through the electrically isolative ring to the last one of the batteries.

5. The illuminative universal joint according to claim 4 wherein the light source is a light emitting diode.

6. The illuminative universal joint according to claim 4 wherein the illuminative device includes a socket for receiving the batteries.

7. The illuminative universal joint according to claim 4 wherein the switch includes a bolt movably inserted into the space between an OFF position separating the batteries from each other and an ON position allowing the batteries to contact each other.

8. The illuminative universal joint according to claim 7 wherein the switch includes a spring compressed between the second element and a head of the bolt.

9. The illuminative universal joint according to claim 8 wherein the illuminative device includes a socket defining a space for receiving the batteries and a slot for receiving the bolt.

10. The illuminative universal joint according to claim 1 including a C-ring, wherein the second element includes a groove defined in the wall of the hole for receiving an external edge of the C-ring, and the head defines a groove for receiving an internal edge of the C-ring.

\* \* \* \* \*